Jan. 15, 1963     E. J. KNIGHT ET AL     3,073,511
TEMPERATURE COMPENSATED COMPRESSOR BLEED CONTROL MECHANISM
Filed May 18, 1959     3 Sheets-Sheet 2

INVENTORS:
EDWARD J. KNIGHT
ELMER D. MARLIN
BY
Herschel C. Omohundro
ATTORNEY

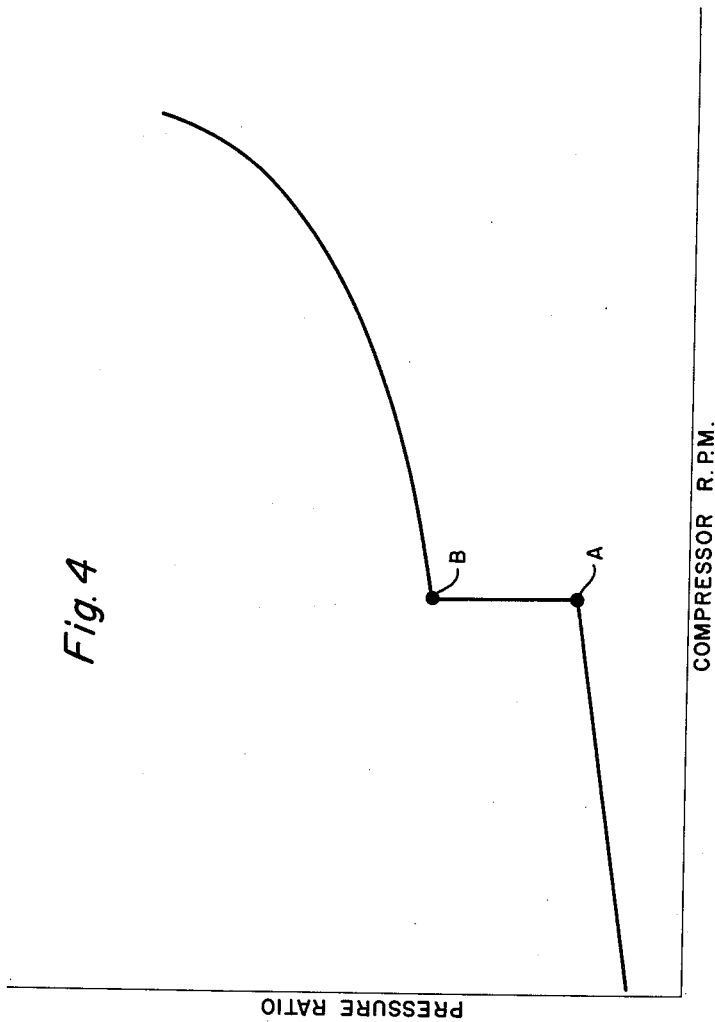

3,073,511
TEMPERATURE COMPENSATED COMPRESSOR BLEED CONTROL MECHANISM
Edward J. Knight and Elmer D. Marlin, Phoenix, Ariz., assignors to The Garrett Corporation, Los Angeles, Calif., a corporation of California
Filed May 18, 1959, Ser. No. 813,950
11 Claims. (Cl. 230—115)

This invention relates generally to compressors of the type forming a part of a gas turbine engine and supplying air to support combustion for the generation of gases used to drive the turbine. More particularly, the invention relates to apparatus for automatically controlling a valve or other device to bleed compressed air from the compressor in the operation thereof to prevent surge and consequent faulty operation of the engine.

In the operation of gas turbine engines, especially during the period between the initiation of operation and the attainment of designed normal operating speed, there is a tendency for the compressor blades to stall, or in other words, for the compressor to develop a surge condition. At such times the engine may fail to start, the start may be delayed, or the operation may otherwise be faulty and severe damage to the compressor may occur unless some remedial steps are taken. One step which may be taken to prevent the occurrence of such a condition is to bleed air from the compressor and thus increase the speed of air flow through the engine. In engines having multistage compressors, it has been found desirable to bleed air from one or more of the compressor stages to eliminate or alleviate the trouble. It has also been found desirable to accomplish such bleeding automatically and without requiring the attention of the engine operator.

An object of this invention is to provide an apparatus for bleeding air from a compressor under the control of the early or intermediate stages of a multistage compressor, the apparatus being automatic in operation and having means for compensating for variations in ambient temperature.

An object of the invention also is to provide an apparatus for automatically bleeding air from a compressor during operation thereof below predetermined speeds at related compressor inlet temperatures and interrupting the bleeding operation after the compressor speed has increased beyond the predetermined rate, the apparatus also being operative to automatically reinitiate the bleeding operation and reset itself for a subsequent engine operation after the compressor speed decreases below another predetermined rate.

Another object of the invention is to provide an apparatus for bleeding air from a compressor, the apparatus having a bleed valve with an actuator and means for controlling the actuator in response to pressures developed in the compressor and sensed by an improved pressure ratio sensing device, means also being provided to adjust the pressure ratio sensing device according to changes in ambient temperature to adapt the control to varying operating conditions.

Still another object of the invention is to provide an apparatus for bleeding air from a compressor during the engine starting phase, the apparatus having a normally open bleed valve and an actuator for closing the same when the compressor pressure ratio increases to a predetermined value, the apparatus also having control means for the actuator including valve means responsive to differences between the pressure at the inlet or a selected stage of the compressor and a reference pressure determined by the pressure at another selected stage, the control means further including fluid pressure responsive means for resetting the actuator control for the succeeding starting phase of the engine.

A further object of the invention resides in providing a control mechanism for a compressor bleed valve actuator, the control mechanism having a first fluid pressure responsive valve for controlling the operation of the actuator, and a second valve responsive to a pressure ratio sensing means and serving to control the application of operating pressure to the first fluid pressure responsive valve, the fluid pressure ratio sensing means having a diaphragm assembly exposed to the pressure at the compressor inlet or other selected stage and a reference pressure secured by passing pressure fluid delivered by the compressor through a series of sonic nozzles, one of which may be adjusted through the movement of the diaphragm assembly, variations in the pressure developed by the compressor producing changes in the reference pressure and effecting the operation of the diaphragm assembly.

Another object of the invention is to provide a control mechanism for a compressor bleed valve actuator, the control mechanism having a first fluid pressure responsive valve for controlling the flow of operating fluid to the actuator, a pair of passages disposed in parallel arrangement to conduct operating fluid from a source of pressure to the fluid pressure responsive means of the first valve, a second fluid pressure responsive valve for alternately establishing the flow of fluid through the parallel passages and connecting them with exhaust, a fluid pressure ratio sensing device which is responsive to varying pressures to actuate the fluid pressure responsive means of the second valve, means responsive to variations in temperature for adjusting the second valve to vary its operating range, and a resetting device communicating with one of the passages of the parallel pair and operating to dispose the fluid pressure responsive means of the first valve in condition for the next succeeding operation of the control system.

With the foregoing and other objects in mind, which will be apparent from the following part of the specification, the invention consists in the novel features of construction and combinations of elements set forth in the following description of one form of the invention shown more or less schematically in the accompanying drawing.

In the drawing:

FIG. 4 is a graph showing the relation between the pressure ratio and speed of a compressor in which the bleed valve is controlled by the mechanism of this invention.

Figure 1:
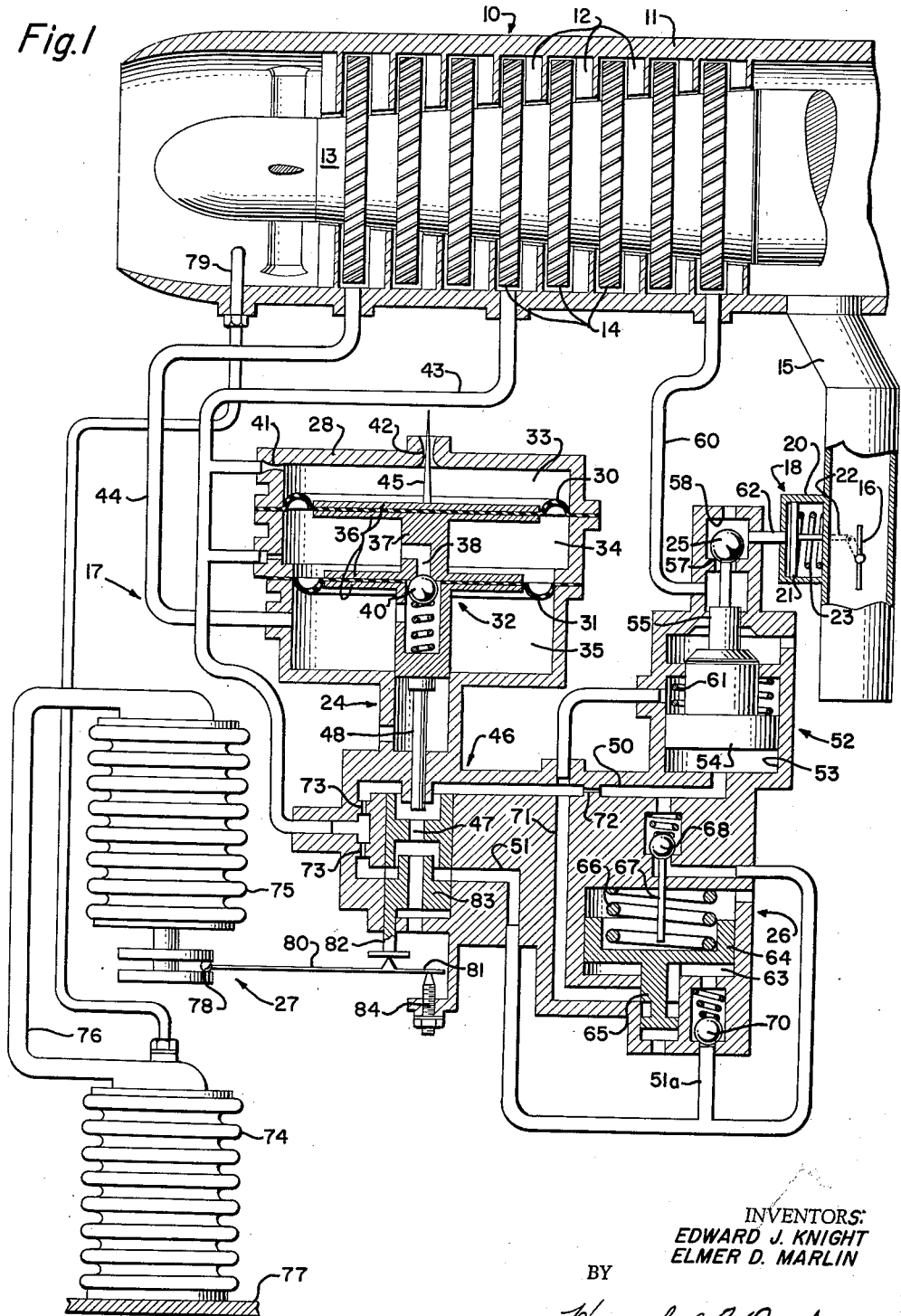
FIGURE 1 is a schematic view of a compressor bleed control mechanism embodying the principles of the present invention.

Referring more particularly to the drawings, numeral 10 designates generally the compressor section of a gas turbine engine. A multistage axial flow compressor has been selected for illustration, but it is to be understood at this time that the invention may be applied to other types of compressors having one or more stages of compression. The compressor 10 is illustrated schematically and, as usual, includes a casing 11 with inwardly projecting stator blades 12, and a rotor 13 with radially projecting movable blades 14. The blades 12 and 14 are of conventional construction and are arranged in alternate banks to provide successive stages of compression. A passage 15 extends from the casing, adjacent a selected stage of compression, to the ambient atmosphere or a region of reduced pressure, for bleeding air from the compressor to prevent surging thereof. Valve 16 is disposed in the passage 15 to control the flow of fluid therethrough. The invention is directed to a system, designated generally by the numeral 17, for controlling the operation of the valve 16 according to a predetermined schedule of operation of the compressor. The valve 16 is operated by a fluid pressure responsive actuator 18 having a cylinder 20, a piston 21 slidably disposed therein and connected to valve 16 by a connecting rod and lever 22, and a spring 23, the latter tending to maintain valve 16 in an open position.

System 17 includes a pressure ratio sensor and pilot valve mechanism 24, a control valve 25 for the bleed valve actuator 18, a resetting device 26, a temperature compensating device 27, and connecting passage.

The pressure ratio sensor and pilot valve mechanism 24 has a casing 28 formed to marginally clamp a pair of diaphragms 30 and 31 which comprise a movable assembly 32 and divide the interior of the casing into first, second, and third chambers 33, 34 and 35, respectively. Movable diaphragm assembly 32 also includes clamp plates 36 and body 37, the latter having a passage 38 establishing communication between chambers 34 and 35 for preventing damage to diaphragm 31 due to excessive pressures. The passage contains a spring pressed check valve 40 to limit pressure differences which may exist at opposite sides of diaphragm 31. Casing 28 has a pair of sonic nozzles 41 and 42 formed therein to admit air under pressure from passage 43, leading from an intermediate stage of the compressor, to chamber 33 and to permit flow of air from such chamber to a region of lower pressure such as the atmosphere. Nozzles 41 and 42, when choked, form a pressure divider, and due to the pressure differentials caused by the nozzles a reference pressure will exist in the chamber 33, such reference pressure bearing a predetermined relation to the pressure from the selected stage of the compressor through passage 43. Chamber 34 also communicates with passage 43 to receive fluid under pressure from the selected stage of the compressor. The pressure in chamber 34 is effective over the portion of the area of diaphragm 30 which is in excess of the area of diaphragm 31. The difference in areas between diaphragms 30 and 31 is calculated in the design of the pressure ratio sensor to cause the diaphragm assembly to operate in a desired manner. For example, the areas of the diaphragms are calculated to cause the diaphragm assembly to be in equilibrium when the pressures applied to opposite sides thereof are at a selected ratio.

Chamber 35 communicates via a passage 44 with the compressor inlet or a selected early stage of compression. This chamber will, therefore, contain fluid at or above atmospheric pressure. After the compressor starts to compress air, the pressure in passage 43 will increase, causing a flow through nozzle 41 into chamber 33 and from this chamber through nozzle 42 to the atmosphere. As mentioned above, nozzles 41 and 42 are of the sonic type, in other words, shaped and sized so that when they are supplied with sufficient air they become choked and within certain limits the volume of air flowing therethrough is unaffected by the pressure at the outlet sides of the nozzles. Due to the type of nozzles and the fact that they are choked, a reference pressure is secured in chamber 33. As the compressor speed increases and more air is delivered, the reference pressure in chamber 33 will increase, causing the differential between pressures in chambers 33 and 35 to increase. As a result, the diaphragm assembly will move toward the lower end of the casing as viewed in FIG. 1.

As the diaphragm assembly moves downwardly because of increased compressor output, a needle valve element 45, projecting from the diaphragm assembly, moves in an outward direction in the nozzle 42 to change the effective area thereof, whereby the additional volume of air admitted through nozzle 41 will be permitted to flow through the nozzle 42 and thus maintain the reference pressure. The diaphragm assembly will move until it reaches equilibrium in a new position determined by the pressure ratio of the compressor at the existing inlet temperature.

Casing 28 includes a pilot valve section 46 in which a bore 47 is formed for the slidable reception of a rod-type pilot valve 48. This element is formed with the diaphragm assembly 32 and is moved in the bore 47 when the diaphragm assembly moves. Casing 28 is also formed with a pair of passages 50 and 51 which are connected with passage 43 and lead in parallel relation to an actuator 52 for the valve 25 which controls fluid flow to bleed valve actuator 18.

Actuator 52 has a cylinder 53 in which a piston 54 is disposed for sliding movement. A rod 55 projects from the piston 54 and is connected at the free end with the ball valve 25 which is provided for alternate engagement with seats 57 and 58. When the piston 54 and valve 25 are positioned as shown in FIG. 1, the valve 25 prevents the flow of air from the compressor through passage 60 to the actuator 18, and spring 23 will hold the bleed valve 16 in an open position. When air is supplied to the cylinder 53, however, it will move piston 54 in opposition to the force of spring 61 to a position (see FIGS. 2 and 3) in which the ball valve will be engaged with seat 58. At this time, passage 60 will be connected through seat 57 and passage 62 with cylinder 20 of actuator 18. Fluid pressure from the compressor will then move the piston 21 to a position to close valve 16 and bleed flow from the compressor will be interrupted.

Figure 2:
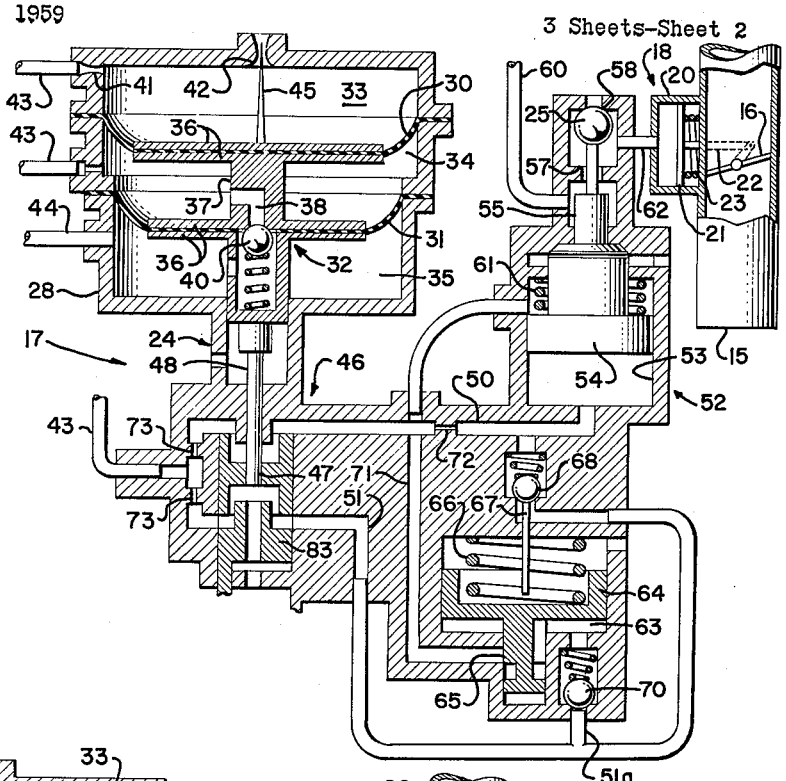
FIG. 2 is a similar view of a portion of the mechanism shown in FIG. 1 with parts thereof in positions occupied after a predetermined increase in compressor pressure ratio.

Fluid flow through passage 50 to the cylinder 53 will occur when the diaphragm assembly 32 moves a distance sufficient to cause pilot valve rod 48 to interrupt the communication of passage 50 with the atmosphere through the bore 47 (see FIG. 2). When such movement takes place, air from the compressor will flow through passage 50 to cylinder 53 with the above-mentioned result.

A curve of the pressure ratio relative to compression speed is shown in FIG. 4. This curve shows that the pressure ratio gradually increases until a predetermined value A is reached. Then, the bleed valve is closed by the bleed control mechanism and the compressor pressure ratio will instantly increase to the value indicated by the letter B, after which it will continue to increase gradually as compressor speed increases.

Figure 3:
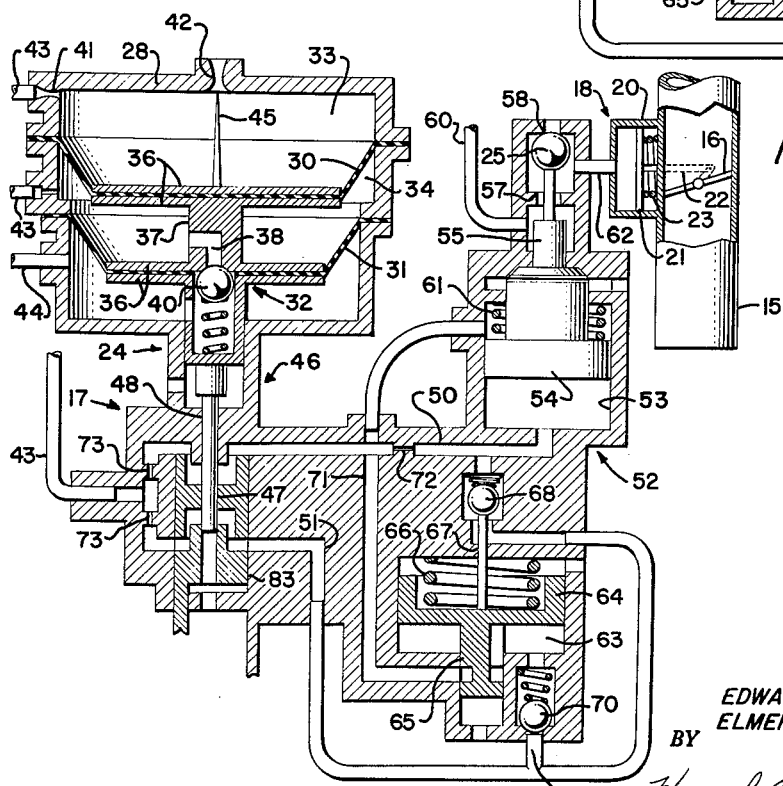
FIG. 3 is also a similar view of a portion of the mechanism with parts thereof in still other positions following further increase of compressor pressure ratio.

As the compressor speed increases, the increasing output pressure will cause further movement of the diaphragm assembly until valve rod 48 interrupts communication of passage 51 with the atmosphere through bore 47 (see FIG. 3). At this time, air from the compressor will flow through passage 51 and a branch 51a thereof to a chamber 63 forming a part of the resetting means 26. The chamber 63 receives a piston element 64 having a valve projection 65 extending therefrom. Fluid under pressure supplied through branch 51a will cause piston 64 to move in opposition to a spring 66 and engage a rod 67 extending from a check valve 68. This check valve normally prevents communication between the passage 51 and cylinder 53, but when opened by piston 64 engaging and moving rod 67 (see FIG. 3), such communication is established and will continue until the retraction of piston 64. Branch 51a contains a spring pressed check valve 70 to prevent flow from chamber 63 through the branch passage.

After valve rod 48 reaches the position at which communication between passage 51 and the atmosphere is interrupted, passages 50 and 51 and the chambers communicating therewith will contain fluid at the pressure of the compressor stage with which passage 43 communicates and piston 54 will hold valve 25 in engagement with seat 58. In such position air from the compressor is applied to actuator 18 to hold bleed valve 16 closed. Piston 64 will also be held in position to retain valve 68 in an open condition, as shown in FIG. 3. In such position of piston 64, the valve projection 65 is disposed to establish communication between the chamber 63 and a branch passage 71 which connects with passage 50.

When the engine is shut down, the compressor speed starts to decline and the pressure ratio begins to change. Pressure in passage 43 falls, causing a decrease in the reference pressure in chamber 33. The diaphragm assembly then becomes unbalanced toward the reference pressure chamber and will start to retract or move upwardly, as viewed in FIG. 1. This retraction of the diaphragm assembly withdraws pilot valve rod 48 until communication between passage 51 and the atmosphere is re-established. At this time air may flow from cylinder 53 through passage 51 and bore 47 to the atmosphere because valve 68 is still retained in an open position by the resetting piston 64. It will be noted that passage 50 contains a restriction 72 which prevents excessive flow of compressor output pressure through line 50 to line 51 when valve 68 is open. This restriction also insures the retention of sufficient fluid under pressure in chamber 63 to hold valve 68 open until piston 54 and valve 25 are reset.

One feature of this invention is that the bleed valve 16 is reopened during the shutdown deceleration in compressor speed at a different and higher pressure ratio than that at which the valve is opened when the compressor is accelerating. This action is secured by providing the second passage 51, valve 68, and resetting piston 64. When the pilot valve rod 48 is retracting, communication is established between piston chamber 53 and the atmosphere at an early stage of the retraction of valve rod; such communication had been interrupted at an early stage in the advancing movement of such valve rod.

As compressor output pressure continues to decline and the pilot valve rod 48 is further retracted, passage 50 will eventually be reconnected with the atmosphere and air can escape from the chamber 63 through branch passage 71 and passage 50 until piston 64 has moved valve projection 65 to a closed position, in which it is shown in FIG. 1. It will be noted that passages 50 and 51 each contain restrictions 73 adjacent the point of connection thereof with compressor output pressure supply passage 43 to insure sufficient flow of fluid through passage 50 when passage 51 is communicating with the atmosphere.

It will be noted from FIG. 1 that means are provided to adjust the mechanism to compensate for changes in compressor inlet air temperature. This temperature compensating means is indicated generally by the numeral 27 and includes a pair of sealed bellows 74 and 75 and a probe 79 connected with bellows 74 by a capillary tube, the probe being disposed in the compressor inlet. Bellows 74 and 75, probe 79, and the capillary are filled with a fluid which responds to thermal changes. A relatively rigid member 76 connects the upper ends of bellows 74 and 75, as viewed in FIG. 1. The lower end of bellows 74 is secured to a rigid support 77. It will be seen that changes in inlet air temperature will cause the expansion or contraction of the fluid in the probe 79 and a resulting change in the length of bellows 74. Since the free end of this bellows is connected with bellows 75, movement of the former will be transmitted through the latter to one end 78 of a lever 80. The opposite end of this lever is pivotally supported adjacent the pressure ratio sensor and pilot valve mechanism, as at 81. An intermediate portion of the lever 80 is engaged with a projection 82 formed on a barrel member 83 which is adjustably supported in the casing 28. This barrel member 83 contains the bore 47 which slidably receives the pilot valve rod 48 and forms part of the valve. Since the pressure ratio sensor and bleed valve controlling mechanism will probably be located remotely from the compressor inlet, the temperature in the vicinity of such mechanism may be quite different from that in the compressor inlet. To avoid error or inaccuracy in the operation of the mechanism, the dual bellows arrangement 74, 75 and 76 has been provided. Due to the connection by the rigid element 76 of corresponding ends of bellows 74 and 75, changes in these elements, due to ambient temperature variations, will counteract one another and the end 78 of lever 80 will move only in response to variations caused by temperature variations around probe 79 in the compressor inlet. When compressor inlet air temperature changes, the barrel member 83 will be adjusted relative to the valve rod 48 and the point at which the bleed valve 16 will close or open will be varied accordingly. The initial setting of the barrel 83 may be determined by adjusting the pivotal point of lever 80 through the operation of screw 84.

The operation of the system should be clear from the foregoing description. It may be summarized as follows:

When the engine, including the compressor 10, is not in operation, bleed valve 16 is retained in an open position, as shown in FIG. 1. During the initial stages of operation of the compressor, air will be caused to flow through the compressor and some air will be bled through the passage 15. As the compressor accelerates, the pressure will increase in passage 43 and air will be caused to flow through orifice 41, chamber 33 and orifice 42. Some air will also flow from passage 43 through orifices 73 to bore 47 and out to the atmosphere. The air flowing through nozzle 41 to chamber 33 and outwardly through nozzle 42 builds a reference pressure in chamber 33, such pressure being applied to diaphragm 30 and causing the diaphragm assembly 32 to move toward chamber 35. This movement is transmitted to the pilot valve rod 48. When the compressor output pressure reaches the ratio determined by the sensor 24, the valve rod will be moved to a position (see FIG. 2) to interrupt communication between passage 50 and the atmosphere, and air will then flow from passage 43 to cylinder 53. Such air will move piston 54 in opposition to spring 61 and shift valve 25 from seat 57 to seat 58, as shown in FIG. 2. Air under pressure from a selected compressor stage may then flow through passage 60, seat 57, and port 62 to actuator 18, causing piston 21 to move valve 16 to a closed position. Bleed flow through passage 15 will be interrupted.

Continued increase in compressor output pressure causes the additional movement of diaphragm assembly 32. Valve rod 48 will eventually interrupt communication between passage 51 and the atmosphere, as shown in FIG. 3, and air from passage 43 will flow through passage 51 and 51a to chamber 63. Air pressure in this chamber moves piston 64 against the force of spring 66 and causes the unseating of valve 68. Such movement of piston 64 also disposes valve extension 65 in position (see FIG. 3) to connect chamber 63 with passage 50 via passage 71. When compressor output pressure ceases to increase, check valve 70 closes, trapping air in chamber 63 to hold piston 64 in position to retain valve 68 in an open condition. When compressor output pressure recedes enough after engine shutdown, the diaphragm assembly 32 will start to retract and the valve rod will move outwardly in bore 47. After the valve rod moves outwardly a predetermined distance corresponding to a previously selected pressure ratio of the compressor, communication between passage 51 and the atmosphere will be re-established and air from cylinder 53 will escape past open valve 68 through passage 51 and bore 47 to the atmosphere. Piston 54 will be forced backward by spring 61 until valve 25 engages seat 57. When valve 25 is disengaged from seat 58, cylinder 20 will be vented to atmosphere through passage 62 and seat port 58, and spring 23 may then move piston 21 to a position to open valve 16.

As the compressor output further decreases, the diaphragm assembly 32 will continue to retract the valve rod until passage 50 again communicates with the atmosphere through bore 47. When this communication is established, air from chamber 63 will flow through the passage in valve extension 65, through passages 71 and 50, and through bore 47 to the atmosphere. The escape of air from chamber 63 permits piston 64 to return to a position in which communication between chamber 63 and passage 71 is interrupted by valve extension 65, and valve 68 prevents communication between passage 51 and cylinder 53. The control mechanism is then in condition for the next cycle of operation.

While but a single embodiment of the invention has been illustrated and described, it should be obvious that many minor changes may be made in the construction and arrangement of parts without departing from the spirit and scope of the invention.

We claim:

1. Bleed control apparatus for a compressor of the type having a bleed passage leading from a selected stage of the compressor and a bleed valve in the bleed passage, said control apparatus comprising: first fluid pressure responsive means adapted to be operatively connected with the bleed valve for opening and closing the bleed valve; a passage for supplying fluid pressure to said first fluid pressure responsive means; second fluid pressure responsive means for controlling the flow of fluid pressure through said passage to said first fluid pressure responsive means; pilot control means for controlling the flow of fluid pressure to said second fluid pressure responsive means, said pilot control means including a first passage and a second passage both of which are connected at one of their ends with a source of fluid pressure and at the other of their ends with said second fluid pressure responsive means, an outlet for each of said passages intermediate their ends thereof, valve means movable from one position wherein both of said outlets are open to a second position wherein fluid pressure is caused to flow through said first passage to said second fluid pressure responsive means, and to a third position wherein both of said outlets are closed and sensor means adapted to be connected with selected stages of the compressor for sensing the ratio of pressures therein and operatively connected with said valve means for moving said valve means to any one of said three positions in response to variations of the ratio; and reset means in communication with said second passage for controlling the exhausting of fluid pressure from said second fluid pressure responsive means.

2. Bleed control apparatus for a compressor of the type having a bleed passage leading from a selected stage of the compressor and a bleed valve in the bleed passage, said control apparatus comprising: first fluid pressure responsive means adapted to be operatively connected with the bleed valve for opening and closing the bleed valve; a passage for supplying fluid pressure to said first fluid pressure responsive means; second fluid pressure responsive means for controlling the flow of fluid pressure through said passage to said first fluid pressure responsive means; pilot control means for controlling the flow of fluid pressure to said second fluid pressure responsive means, said pilot control means including a first passage and a second passage both of which are connected at one of their ends with a source of fluid pressure and at the other of their ends with said second fluid pressure responsive means, an outlet for each of said passages intermediate the ends thereof, valve means movable from one position wherein both of said outlets are open to a second position wherein fluid pressure is caused to flow through said first passage to said second fluid pressure responsive means, and to a third position wherein both of said outlets are closed, and sensor means adapted to be connected with selected stages of the compressor for sensing the ratio of pressure therein and operatively connected with said valve means for moving said valve means to any one of said three positions in responsive to variations of the ratio; reset means in communication with said second passage for controlling the exhausting of fluid pressure from said second fluid pressure responsive means; and means for varying the operation of the pilot control means in response to changes in temperature in a predetermined region of the compressor.

3. Bleed control apparatus for a compressor of the type having a bleed passage leading from a selected stage of the compressor and a bleed valve in the bleed passage, said control apparatus comprising: first fluid pressure responsive means adapted to be operatively connected with the bleed valve for opening and closing the bleed valve; a passage for supplying fluid pressure to said first fluid pressure responsive means; second fluid pressure responsive means for controlling the flow of fluid pressure through said passage to said first fluid pressure responsive means; pilot control means for controlling the flow of fluid pressure to said second fluid pressure responsive mean, said pilot control means including a first passage and a second passage both of which are connected at one tof their ends with a source of fluid pressure and at the other of their ends with said second fluid pressure responsive means, an outlet for each of said passages intermediate the ends thereof, valve means movable from one position wherein both of said outlets are open to a second position wherein fluid pressure is caused to flow through said first passage to said second fluid pressure responsive means, and to a third position wherein both of said outlets are closed, and sensor means adapted to be connected with selected stages of the compressor for sensing the ratio of pressures therein and operatively connected with said valve means for moving said valve means to any one of said three positions in response to variations of the ratio; and reset means in communication with said second passage for controlling the exhausting of fluid pressure through said second passage from said second fluid pressure responsive means including fluid pressure responsive valve means actuated by fluid pressure in said second passage.

4. Bleed control apparatus for a compressor of the type having a bleed passage leading from a selected stage of the compressor and a bleed valve in the bleed passage, said control apparatus comprising: first fluid pressure responsive means adapted to be operatively connected with the bleed valve for opening and closing the bleed valve; a passage for supplying fluid pressure to said first fluid pressure responsive means; second fluid pressure responsive means for controlling the flow of fluid pressure through said passage to said first fluid pressure responsive means; pilot control means for controlling the flow of fluid pressure to said second fluid pressure responsive means, said pilot control means including a first passage and a second passage both of which are connected at one of their ends with a source of fluid pressure and at the other of their ends with said second fluid pressure responsive means, an outlet for each of said passages intermediate the ends thereof, pilot valve means movable from one position wherein both of said outlets are open to a second position wherein fluid pressure is caused to flow through said first passage to said second fluid pressure responsive means, and to a third position wherein both of said outlets are closed, and sensor means adapted to be connected with selected stages of the compressor for sensing the ratio of pressures therein and operatively connected with said pilot valve means for moving said pilot valve means to any one of said three positions in response to variations of the ratio; and reset means in communication with said second passage for controlling the exhausting of fluid pressure through said second passage from said second fluid pressure responsive means including a fluid pressure responsive element actuated by fluid pressure in said second passage and a valve actuated by said element, said valve opening said second fluid pressure responsive means directly to the outlet in said second passage when said pilot valve is in the third position.

5. Bleed control apparatus for a compressor of the type having a bleed passage leading from a selected stage of the compressor and a bleed valve in the passage, said control apparatus comprising: actuator means adapted to be operatively connected with the bleed valve for opening and closing the bleed valve; first means operatively connected with said actuator means for controlling the operation of said actuator means; said first means including a valve and an actuating element therefor responsive to a predetermined ratio of pressures between selected stages of the compressor, said valve controlling the flow of fluid pressure to said actuator means; and second means responsive to a predetermined higher ratio of pressures between the selected stages of the compressor for deactuating said actuator means, said second means including means for sensing ratios of pressures during different speed conditions of the compressor.

6. Bleed control apparatus for a compressor of the type having a bleed passage leading from a selected stage of the compressor and a bleed valve in the bleed passage, said control apparatus comprising: actuator means adapted to be operatively connected with the bleed valve for opening and closing the bleed valve; first means operatively connected with said actuator means for controlling the operation of said actuator means; said first means including a valve and a series of diaphragms connected with said valve for actuating said valve, said diaphragms being responsive to a predetermined ratio of pressures between selected stages of the compressor, said valve controlling the flow of fluid pressure to said actuator means; and second means responsive to a predetermined higher ratio of pressures between the selected stages of the compressor for deactuating said actuator means, said second means including means for sensing ratios of pressures during different speed conditions of the compressor.

7. Bleed control apparatus for a compressor of the type having a bleed passage leading from a selected stage of the compressor and a bleed valve in the bleed passage, and control apparatus comprising: actuator means adapted to be operatively connected with the bleed valve for opening and closing the bleed valve; and means operatively connected with said actuator means for controlling the operation of said actuator; said means including a valve and an operating element therefor, said valve controlling the flow of fluid pressure to said actuator means, said operating element having a diaphragm assembly exposed on one surface to pressure from one stage of the compressor and having means for establishing a reference pressure on another surface of the diaphragm assembly, said latter means including a first sonic nozzle adapted to receive fluid pressure from another stage of the compressor and a second sonic nozzle in series with said first nozzle and discharging fluid pressure into a region of reduced pressure.

8. Bleed control apparatus for a compressor of the type having a bleed passage leading from a selected stage of the compressor and a bleed valve in the bleed passage, said control apparatus comprising: an actuator adapted to be operatively connected with the bleed valve for opening and closing the bleed valve; first means operatively connected with said actuator for controlling the operation of said actuator; and second means operatively connected with said first means for controlling the operation of said first means, said second means including a valve and an operating element therefor, said valve controlling the flow of fluid pressure to said first means for actuating said first means to in turn actuate said actuator, said operating element having a diaphragm assembly exposed on one surface to pressure from one stage of the compressor and having means for establishing a reference pressure in a chamber exposed to another surface of the diaphragm assembly, said latter means including a first sonic nozzle leading into the chamber and adapted to receive fluid pressure from a higher stage of the compressor, and a second sonic nozzle in series with said first nozzle leading from the chamber and discharging fluid pressure to a region of reduced pressure; and means responsive to variations in temperature at said compressor for changing the effectiveness of said second means in responding to variations in the reference pressure so that said first means will be actuated in response to variations in temperature.

9. Bleed control apparatus for a compressor of the type having a bleed passage leading from a selected stage of the compressor and a bleed valve in the bleed passage, said control apparatus comprising: an actuator adapted to be operatively connected with the bleed valve for opening and closing the bleed valve; first means operatively connected with said actuator for controlling the operation of said actuator; second means operatively connected with said first means for controlling the operation of said first means, said second means including first and second fluid passages leading from a source of fluid pressure to said first means, an exhaust opening in each of said passages, and a pilot valve for closing the exhaust opening in said first fluid passage or the exhaust openings in both said first and second fluid passages to allow fluid pressure to pass through said passages to said first means; means in communication with said second passage for controlling the exhaust of fluid pressure from said first means; a differential diaphragm assembly for effecting the operation of said pilot valve to control the flow of fluid pressure through said first and second passages, said diaphragm assembly being exposed on one surface to pressure from a selected stage of the compressor, and means for applying a reference pressure in a chamber to an opposed surface of said diaphragm assembly to effect movement of said pilot valve, said latter means having a plurality of sonic nozzles arranged in series to create a reference pressure, the first nozzle leading into the chamber and receiving pressure fluid from a higher stage of the compressor and a final nozzle leading from the chamber and discharging fluid pressure to a region of reduced pressure, and a valve operatively connected with said diaphragm assembly and disposed to one of said sonic nozzles to vary the effective area of said one nozzle upon movement of the diaphragm assembly, said diaphragm assembly being operative at a predetermined ratio of pressures in the selected stages of the compressor to dispose said pilot valve in position to cause fluid flow through said first passage to said first means and at a different ratio of pressures to dispose said pilot valve in position to cause fluid flow from said first means to exhaust through the exhaust opening in said second passage.

10. Bleed control apparatus for a compressor of the type having a bleed passage leading from a selected stage of the compressor and a bleed valve in the bleed passage, said control apparatus comprising: an actuator adapted to be operatively connected with the bleed valve for opening and closing the bleed valve; a first means leading to said actuator for directing an operating medium thereto; a second means operatively connected with said first means to control the flow of the operating medium to said actuator; a third means leading to said second means for directing an operating medium thereto; a fourth means operatively connected with said third means to control the flow of operating medium to said second means; and sensor means adapted to be connected with said fourth means and the compressor to receive fluid under pressure from selected stages of the latter, said sensor means including means responsive to a predetermined ratio of pressures in said selected stages to cause said fourth means to apply the operating medium to said second means to cause said actuator to close said bleed valve, and also including means responsive to a higher predetermined ratio of pressures in said selected stages to cause said fourth means to interrupt the application of the operating medium to said second means to cause said actuator to open said bleed valve.

11. Bleed control apparatus for a compressor of the type having a bleed passage leading from a selected stage of the compressor and a bleed valve in the bleed passage, said control apparatus comprising: an actuator adapted to be operatively connected with the bleed valve for opening and closing the bleed valve; a first means operatively connected with said actuator for directing an operating medium to and controlling the application thereof to said actuator; a second means operatively connected with said first means for directing an operating medium to and controlling the application thereof to a portion of said first means; and sensor means adapted to be connected with a portion of said second means and the compressor to receive fluid under pressure from selected stages of the latter, said sensor means including means responsive to a predetermined ratio of pressures in said selected stages to make said second means apply the operating medium to said first means to cause said actuator to close said bleed valve, said sensor means also including means responsive to a higher predetermined ratio of pressures in said selected stages to make said second means interrupt the application of the operating medium to said first means to cause said actuator to open said bleed valve.

References Cited in the file of this patent

UNITED STATES PATENTS

| | | |
|---|---|---|
| 2,732,125 | Ruby | June 24, 1956 |
| 2,837,269 | Torell | June 3, 1958 |
| 2,863,601 | Torell | Dec. 9, 1958 |
| 2,886,968 | Johnson | May 19, 1959 |
| 2,930,520 | Abild | Mar. 29, 1960 |
| 2,978,166 | Hahn | Apr. 4, 1961 |

UNITED STATES PATENT OFFICE
CERTIFICATE OF CORRECTION

Patent No. 3,073,511                                    January 15, 1963

Edward J. Knight et al.

It is hereby certified that error appears in the above numbered patent requiring correction and that the said Letters Patent should read as corrected below.

Column 3, line 17, for "passage" read -- passages --; column 8, line 24, for "mean" read -- means --; line 26, for "tof" read -- of --; column 9, line 46, for "and" read -- said --.

Signed and sealed this 27th day of August 1963.

(SEAL)
Attest:

ERNEST W. SWIDER                                    DAVID L. LADD
Attesting Officer                                      Commissioner of Patents